US010877180B2

(12) United States Patent
Liu et al.

(10) Patent No.: US 10,877,180 B2
(45) Date of Patent: Dec. 29, 2020

(54) USING LIGHTNING DATA TO GENERATE PROXY REFLECTIVITY DATA

(71) Applicant: Earth Networks, Inc., Germantown, MD (US)

(72) Inventors: Chonglin Liu, Rockville, MD (US); Robert S. Marshall, Ijamsville, MD (US); Elena Novakovskaia, Chappaqua, NY (US); Christopher Dale Sloop, Mount Airy, MD (US)

(73) Assignee: Earth Networks, Inc., Germantown, MD (US)

( * ) Notice: Subject to any disclaimer, the term of this patent is extended or adjusted under 35 U.S.C. 154(b) by 301 days.

(21) Appl. No.: 15/894,205

(22) Filed: Feb. 12, 2018

(65) Prior Publication Data

US 2018/0180770 A1    Jun. 28, 2018

Related U.S. Application Data

(63) Continuation of application No. 13/742,819, filed on Jan. 16, 2013, now Pat. No. 9,891,345.
(Continued)

(51) Int. Cl.
*G01W 1/16* (2006.01)
*G01W 1/00* (2006.01)
(Continued)

(52) U.S. Cl.
CPC ............... *G01W 1/16* (2013.01); *G01W 1/02* (2013.01)

(58) Field of Classification Search
CPC .......... G01W 1/02; G01W 1/16; G01W 1/10; G01W 1/00; G01W 2001/006;
(Continued)

(56) References Cited

U.S. PATENT DOCUMENTS

| 4,347,618 A * | 8/1982 | Kavouras | G01S 7/4004 342/26 D |
| 4,996,473 A * | 2/1991 | Markson | G01S 5/0009 324/72 |

(Continued)

OTHER PUBLICATIONS

Pessi, Antti, et al., "Relationships among Lightning, Precipitation, and Hydrometeor Characteristics over the North Pacific Ocean, School of Ocean and Earth Science and Technology," University of Hawaii at Manoa, Honolulu, Hawaii, Apr. 2009, pp. 833-846. Year: 2009).*

(Continued)

*Primary Examiner* — John E Breene
*Assistant Examiner* — Jeffrey P Aiello
(74) *Attorney, Agent, or Firm* — Proskauer Rose LLP

(57) ABSTRACT

Methods, systems, and computer program products are described herein for generating proxy reflectivity data associated with lightning activity. A computing device receives data associated with lightning activity for one or more geographical areas. The computing device determines the logarithmic scale of the combined in-cloud and cloud-to-ground flash rate (dBR) for one or more grids of lightning activity based on the received data. The computing device generates proxy reflectivity data based on the dBR of the grids, a rate of change of the dBR, and the geographical area of the lightning activity.

33 Claims, 6 Drawing Sheets

Related U.S. Application Data

(60) Provisional application No. 61/588,087, filed on Jan. 18, 2012.

(51) Int. Cl.
  *G01R 29/08* (2006.01)
  *G01S 13/95* (2006.01)
  *G01W 1/02* (2006.01)

(58) Field of Classification Search
  CPC .......... G01W 2203/00; G01W 2201/00; Y02A 90/14; Y02A 50/12; Y02A 90/15; Y02A 90/18; G06F 3/04815
  USPC ......... 340/500, 539.13, 539.28, 601; 342/26, 342/460; 702/1–4, 179, 181, 189
  See application file for complete search history.

(56) References Cited

U.S. PATENT DOCUMENTS

| | | | | |
|---|---|---|---|---|
| 5,490,239 | A * | 2/1996 | Myers | G06T 15/10 345/581 |
| 7,109,913 | B1 * | 9/2006 | Paramore | G01C 23/00 342/26 B |
| 7,868,811 | B1 * | 1/2011 | Woodell | G01S 7/22 342/26 B |
| 8,159,369 | B1 * | 4/2012 | Koenigs | G01S 7/04 340/963 |
| 2004/0064255 | A1 * | 4/2004 | Egi | G01W 1/00 702/3 |
| 2004/0181340 | A1 * | 9/2004 | Smith | G08B 21/10 702/3 |
| 2006/0125836 | A1 * | 6/2006 | Lojou | G01W 1/16 345/581 |
| 2010/0057275 | A1 * | 3/2010 | Schilke | G01W 1/00 701/14 |
| 2010/0265125 | A1 * | 10/2010 | Kelly | G01S 7/04 342/179 |
| 2011/0090111 | A1 * | 4/2011 | Stagliano, Jr. | G01S 7/025 342/26 R |
| 2011/0148694 | A1 * | 6/2011 | Bunch | G01S 13/953 342/26 B |
| 2011/0248863 | A1 * | 10/2011 | Johnson | G08B 27/006 340/686.1 |
| 2013/0009780 | A1 * | 1/2013 | Marshall | G01W 1/10 340/601 |
| 2017/0371074 | A1 * | 12/2017 | Elkabetz | G01S 13/95 |

OTHER PUBLICATIONS

Mann, Michael E. et al, "Proxy-based reconstructions of hemispheric and global surface temperature variations over the past two millennia," Ohio State University, Columbus, OH, Jun. 2008, pp. 13252-13257.) (Year: 2009).*

Cummings, Kenneth L. et al., "The U.S. National Lightning Detection NetworkTM and Applications of Cloud-to-Ground Lightning Data by Electric Power Utilities," IEEE Transactions of Electromagnetic Compatibility, vol. 40, No. 4, Nov. 1998, pp. 465-480. (Year: 1998).*

* cited by examiner

USING LIGHTNING DATA TO GENERATE PROXY REFLECTIVITY DATA

RELATED APPLICATIONS

This application is a continuation of U.S. patent application Ser. No. 13/742,819, filed Jan. 16, 2013, which claims priority to U.S. Provisional Patent Application No. 61/588,087, filed Jan. 18, 2012.

FIELD OF THE INVENTION

The subject matter of this application relates generally to using lightning activity data captured by a lightning detection network to generate proxy reflectivity data.

BACKGROUND

Traditionally, meteorologists have relied on data obtained from radar-based networks (e.g., National Weather Service) to analyze the severity of weather systems over a large geographic area. Radar-based networks are used to generate images that depict the location, movement, and intensity of weather phenomena such as precipitation. However, deployment of such radar-based networks is expensive. For example, many underdeveloped or developing countries do not have the infrastructure or resources to support the installation of a radar-based network. In addition, radar-based networks are susceptible to blind spots or holes in the network coverage (i.e., areas the radar cannot reach) due to height limitations and geographical obstacles like mountains or large bodies of water.

More recently, lightning detection networks (e.g., Earth Networks Total Lightning Network (TLN)) have been installed to monitor the strength and frequency of lightning activity. The lightning detection networks track both cloud-to-ground and intracloud lightning. Because lightning is often associated with severe weather (e.g., tornadoes, hail), data generated by the lightning detection networks is used to identify the location of potentially dangerous weather systems and issue alerts to people in the affected area. The installation of a lightning detection network is typically much cheaper than the installation of a similar radar-based network. Also, lightning detection networks are able to see higher into the atmosphere than radar-based networks, and often can be installed to cover geographical areas that radar-based networks cannot, without holes or blind spots.

SUMMARY OF THE INVENTION

The techniques described herein provide for the use of lightning data from a lightning detection network to generate proxy radar reflectivity data depicting precipitation intensity. The resulting images generated by these techniques appear visually like traditional composite radar images. As a result, the images can be easily understood and interpreted by many people because they are already used to viewing radar images. Also, lightning data captured by lightning detection networks generally has a better correlation to severe weather than radar data alone. Finally, the techniques described herein take advantage of the cost savings associated with installation and configuration of lightning detection networks versus traditional radar networks.

The invention, in one aspect, features a computerized method of generating proxy reflectivity data and radar-type images associated with lightning activity. A network of lightning detection sensors each monitoring a particular geographical area detects radio-frequency (RF) energy data associated with lightning flashes in the corresponding geographical area. The network of lightning detection sensors transmits the RF energy data to a computing device communicably coupled to the network of lightning detection sensors. The computing device formats the RF energy data received from the network of lightning detection sensors into consolidated lightning flash data. The computing device identifies one or more cells of lighting activity based upon the consolidated lightning flash data, comprising positioning each lightning flash on a map according to its geographic location, superimposing a first grid on the map and identifying sectors of the first grid with a high density of lightning flashes, superimposing a second grid only on the identified sectors of the map to locate closed contours associated with a lightning cell within the identified sectors, and generating a convex polygon from each of the closed contours, wherein sectors of the first grid are larger in geographic area than sectors of the second grid. The computing device determines a logarithmic scale of a combined in-cloud and cloud-to-ground flash rate (dBR) for the identified cells of lightning activity. The computing device generates proxy reflectivity data based on the dBR of the identified cells of lightning activity, a rate of change of the dBR, and the geographical location of the identified cells of lightning activity. A graphics processing unit (GPU) of the computing device generates radar-type images based upon the proxy reflectivity data, the radar-type images including a polygon that has a position corresponding to a position of each convex polygon generated by the computing device and that has a color associated with a severity of the lightning activity. A display device coupled to the GPU displays the radar-type images. The computing device transmits the radar-type images to one or more remote computing devices monitoring geographical areas at risk that correspond to geographical areas in the radar-type images as part of an alert notification message. Upon receiving the alert notification message, each remote computing device activates a display screen of the remote computing device and updates the display screen to show the radar-type images.

The invention, in another aspect, features a system for generating proxy reflectivity data and radar-type images associated with lightning activity. The system comprises a computing device having a processor and a graphics processing unit (GPU) that is communicably coupled to a network of lightning detection sensors each monitoring a particular geographical area. The network of lightning detection sensors is configured to detect radio-frequency (RF) energy data associated with lightning flashes in the corresponding geographical area. The network of lightning detection sensors transmits the RF energy data to the computing device. The computing device formats the RF energy data received from the network of lightning detection sensors into consolidated lightning flash data. The computing device identifies one or more cells of lighting activity based upon the consolidated lightning flash data, comprising positioning each lightning flash on a map according to its geographic location, superimposing a first grid on the map and identifying sectors of the first grid with a high density of lightning flashes, superimposing a second grid only on the identified sectors of the map to locate closed contours associated with a lightning cell within the identified sectors, and generating a convex polygon from each of the closed contours, wherein sectors of the first grid are larger in geographic area than sectors of the second grid. The computing device determines a logarithmic scale of a combined in-cloud and cloud-to-ground flash rate (dBR) for the identified cells of lightning activity. The computing device generates proxy reflectivity data based on the dBR of the identified cells of lightning activity, a rate of change of the dBR, and the geographical location of the identified cells of lightning activity. The graphics processing unit (GPU) of the computing device generates radar-type images based upon the proxy reflectivity data, the radar-type images including a polygon that has a position corresponding to a position of each convex polygon generated by the computing device and that has a color associated with a severity of the lightning activity. A display device coupled to the GPU displays the radar-type images. The computing device transmits the radar-type images to one or more remote computing devices monitoring geographical areas at risk that correspond to geographical areas in the radar-type images as part of an alert notification message. Upon receiving the alert notification message, each remote computing device activates a display screen of the remote computing device and updates the display screen to show the radar-type images.

The invention, in another aspect, features a computer program product, tangibly embodied in a non-transitory computer readable storage medium, for generating proxy reflectivity data and radar-type images associated with lightning activity. The computer program product includes instructions operable to cause a computing device having a processor and a graphics processing unit (GPU) and that is communicably coupled to a network of lightning detection sensors to detect radio-frequency (RF) energy data associated with lightning flashes in the corresponding geographical area. The network of lightning detection sensors transmits the RF energy data to the computing device. The computing device formats the RF energy data received from the network of lightning detection sensors into consolidated lightning flash data. The computing device identifies one or more cells of lighting activity based upon the consolidated lightning flash data, comprising positioning each lightning flash on a map according to its geographic location, superimposing a first grid on the map and identifying sectors of the first grid with a high density of lightning flashes, superimposing a second grid only on the identified sectors of the map to locate closed contours associated with a lightning cell within the identified sectors, and generating a convex polygon from each of the closed contours, wherein sectors of the first grid are larger in geographic area than sectors of the second grid. The computing device determines a logarithmic scale of a combined in-cloud and cloud-to-ground flash rate (dBR) for the identified cells of lightning activity. The computing device generates proxy reflectivity data based on the dBR of the identified cells of lightning activity, a rate of change of the dBR, and the geographical location of the identified cells of lightning activity. The graphics processing unit (GPU) of the computing device generates radar-type images based upon the proxy reflectivity data, the radar-type images including a polygon that has a position corresponding to a position of each convex polygon generated by the computing device and that has a color associated with a severity of the lightning activity. A display device coupled to the GPU displays the radar-type images. The computing device transmits the radar-type images to one or more remote computing devices monitoring geographical areas at risk that correspond to geographical areas in the radar-type images as part of an alert notification message. Upon receiving the alert notification message, each remote computing device activates a display screen of the remote computing device and updates the display screen to show the radar-type images.

Any of the above aspects can include one or more of the following features. In some embodiments, the proxy reflectivity data is based on a calibration of the dBR with reflectivity data generated by a radar (dBZ). In some embodiments, the geographical areas associated with the received data correspond to one or more geographical areas being monitored by a radar network. In some embodiments, a climate of the geographical areas associated with the received data matches a climate of one or more geographical areas being monitored by the radar network.

In some embodiments, the radar-type images are comprised of grids that represent precipitation intensity. In some embodiments, the radar-type images use different colors and contours to represent levels of precipitation intensity associated with the grids. In some embodiments, the computing device combines the proxy reflectivity data with a forecast model; and generating, by the computing device, a proxy radar map of precipitation intensity based upon the combined reflectivity data and forecast model for display on a display device coupled to the computing device. In some embodiments, the proxy radar map includes one or more visual indicators related to areas of potential or actual flooding. In some embodiments, the proxy radar map includes one or more visual indicators related to storm motion. In some embodiments, the proxy radar map includes one or more visual indicators related to dangerous cells of lightning activity.

In some embodiments, the proxy reflectivity data is merged with the forecast model at areas where precipitation intensity is similar. In some embodiments, the proxy reflectivity data is dampened at areas where the forecast model shows intense precipitation and the proxy reflectivity data does not show intense precipitation. In some embodiments, the proxy reflectivity data supersedes the forecast model at areas where the proxy reflectivity data shows intense precipitation and the forecast model does not show intense precipitation. In some embodiments, the computing device transmits the proxy reflectivity data to a remote computing device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
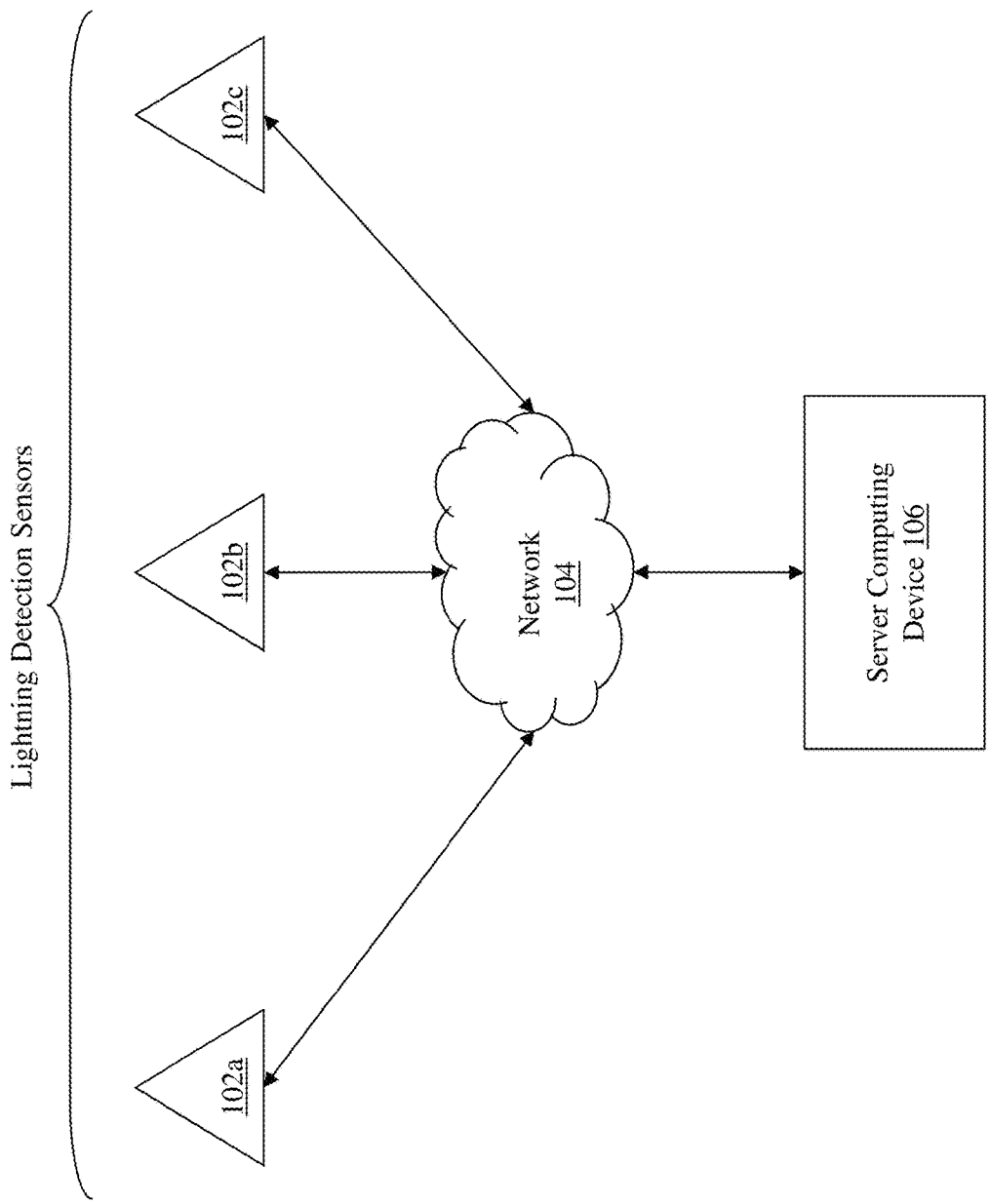
FIG. 1 is a block diagram of a system for detecting lightning activity and collecting lightning activity data.

FIG. 1 is a block diagram of a system 100 for detecting lightning activity and collecting lightning activity data. The system 100 includes a plurality of lightning detection sensors 102a-c, a communications network 104, and a server computing device 106. It should be understood that although three lightning detection sensors 102a-102c are depicted in FIG. 1, any number of lightning detection sensors can be used in the system 100. Also, the system 100 is not limited to a single communications network 104 or server computing device 106; other configurations and network structures can be used without departing from the scope of the invention.

The plurality of lightning detection sensors 102a-102c are deployed in different geographical areas and the sensors 102a-102c are used to monitor a particular area for the presence of total lightning activity (both cloud-to-ground (CG) and in-cloud (IC)) in the atmosphere. For example, the data collected by the sensors 102a-102c includes analog radio frequency (RF) energy (e.g., pulses or flashes) at different frequencies, as emitted by a lightning discharge. Additional detail regarding detection of lightning activity and collection and analysis of lightning activity data is found in U.S. Pat. No. 8,275,548, titled "Method and Apparatus for Detecting Lightning Activity," and in U.S. patent application Ser. No. 13/177,226, filed Jul. 6, 2011 and titled "Predicting the Potential for Severe Weather," both of which are incorporated herein in their entirety.

In some embodiments, the respective coverage areas monitored by each of the sensors 102a-102c overlap. In some embodiments, the sensors 102a-102c communicate with the server computing device 106 for purposes of calibration and error correction.

Once the sensors 102a-102c have collected the lightning data, the sensors 102a-102c transmit the lightning data to the server computing device 106 via the network 104. For example, the network 104 can be a packet-based network (e.g., Internet). The communications link between the sensors 102a-102c and the network 104 and/or the network 104 and the server computing device 106 can be a wireless connection (e.g., cellular or satellite). It should be appreciated that different configurations, protocols and architectures can be used to transmit data from the sensors 102a-102c to the server computing device 106 without departing from the scope of the invention. In some embodiments, the system 100 includes an intermediate computing device between some or all of the sensors 102a-102c and the server computing device 106 to aggregate and/or format the lightning data before the data is received by the server computing device 106.

Figure 2:
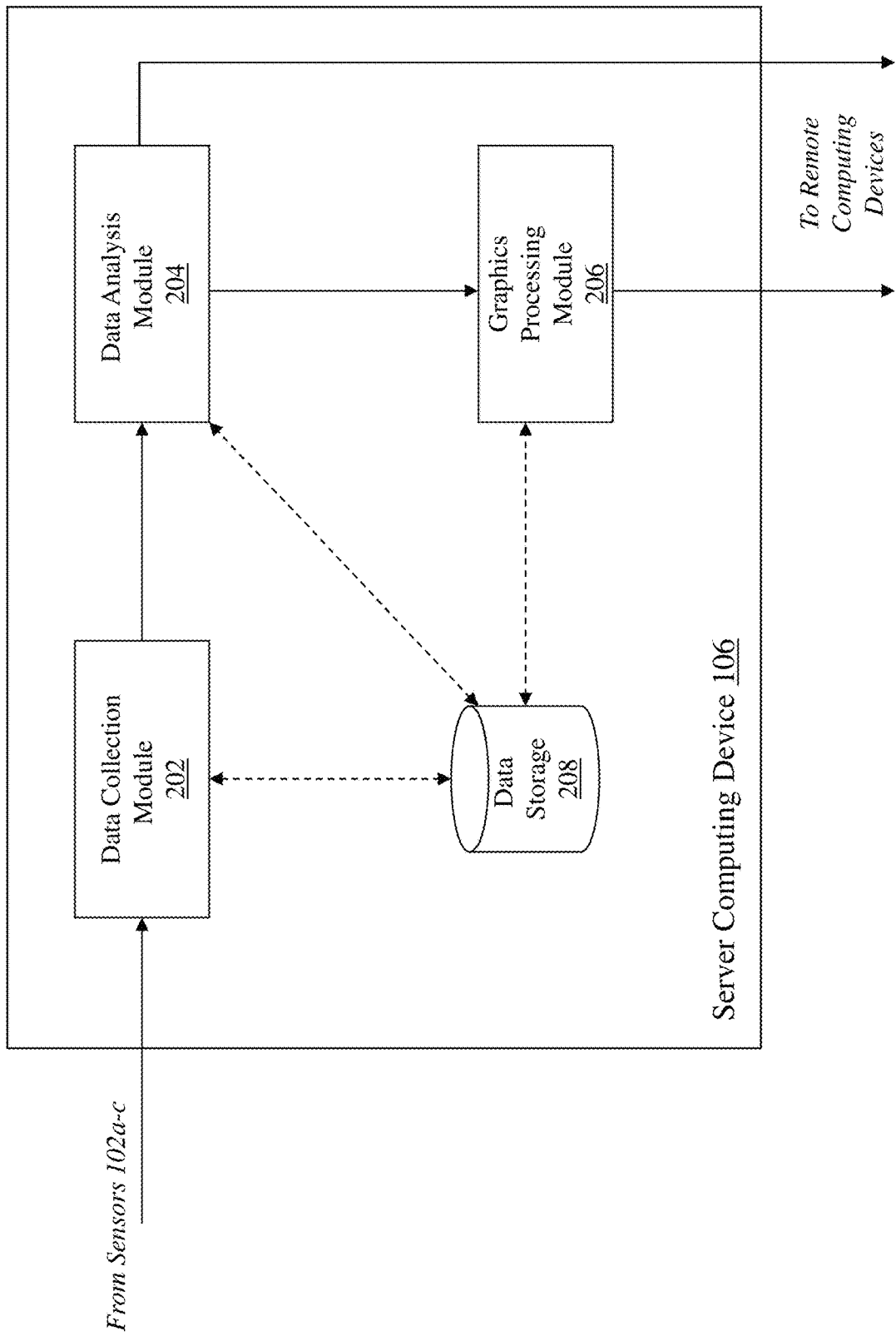
FIG. 2 is a block diagram of a system for generating proxy reflectivity data associated with lightning activity.

The server computing device 106 receives the lightning data from the individual sensors and prepares the lightning data for use in generating proxy reflectivity data. FIG. 2 is a detailed block diagram of the server computing device 106 of the system 100. The server computing device 106 includes a data collection module 202, a data analysis module 204, a graphics processing module 206 and a data storage 208. In some embodiments, the data collection module 202 receives data from other sources of lightning activity information which include, but are not limited to, governmental agencies and third-party private companies. The data collection module 202 communicates with the other sources of lightning activity information via standard communications networks and methods.

Figure 3:
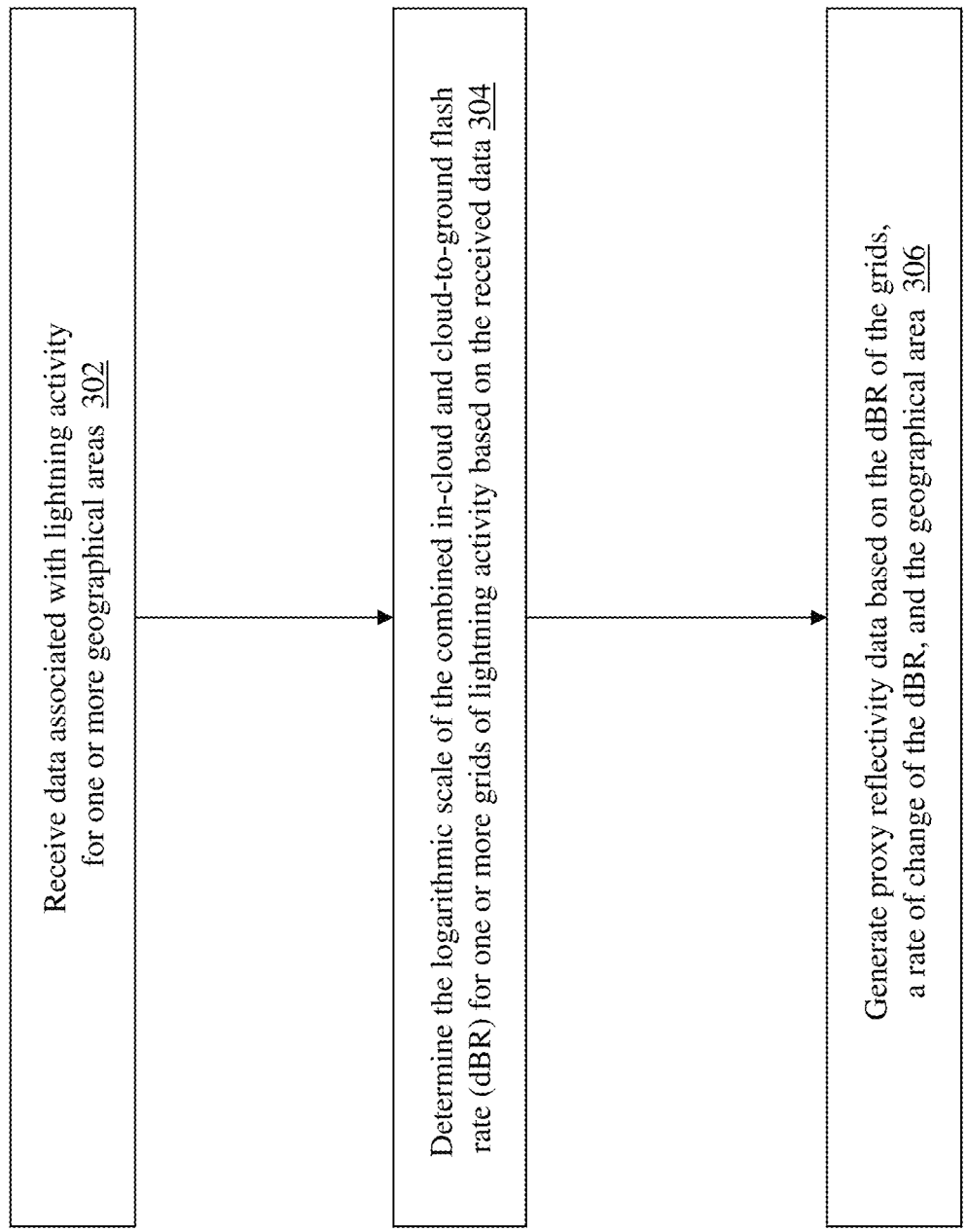
FIG. 3 is a flow diagram of a method for generating proxy reflectivity data associated with lightning activity.

FIG. 3 is a flow diagram of a method 300 for generating proxy reflectivity data associated with lightning activity, using the system of FIG. 2. As set forth above, the data collection module 202 receives (302) data associated with lightning activity for one or more geographical areas from the sensors 102a-102c. The data collection module 202 consolidates lightning activity data received from the sensors 102a-102c (and optionally, a plurality of external data sources) into a format conducive for processing by the data analysis module 204. For example, each data source to which the data collection module 202 is connected may transmit data using a different syntax and/or data structure. The data collection module 202 parses the incoming data according to an understanding of the source of the data and reformat the data so that it conforms to a syntax or structure acceptable to the data analysis module 204. In some embodiments, the sensors 102a-102c transmit the lightning activity data in a standard format (e.g., XML) to reduce the processing required of the data collection module 202. The data collection module 202 communicates with the data storage module 208 to save and retrieve lightning data received from sensors 102a-102c in preparation for transmitting the data to the data analysis module 104. Once the data has been received, the data collection module 202 transmits the data to the data analysis module 204. In some embodiments, the data collection module 202 transmits a notification to the data analysis module 204 that the data has been stored in the data storage module 208 and is ready for processing by the data analysis module 204. The notification includes a reference indicator (e.g., a database address) of the storage location of the data within the data storage module 208.

In some embodiments, the data collection module 202 receives data from the network of lightning detection sensors 102a-102c in real-time or in substantially real-time (e.g., updated every minute). Based on this timely and continuous receipt of lightning data, the server computing device 106 can generate proxy reflectivity data faster and more frequently than the reflectivity data generated by traditional radar-based networks. In addition, the server computing device 106 can make the proxy reflectivity data available to downstream devices and services (e.g., by transmitting the proxy data to devices as part of a data feed or subscription).

To generate the proxy reflectivity data, the data analysis module 204 of the server computing device 106 determines (304) the logarithmic scale of the combined in-cloud and cloud-to-ground flash rate (dBR) for grids of lightning activity based on the lightning data received from the data collection module. A grid of lightning activity is derived by placing a pattern of horizontal and vertical lines spaced out at regular intervals (e.g., 1°×1°) over a map of the geographical areas being monitored by the lightning sensors 102a-102c. The lightning activity in each sector of the grid can be determined, and the corresponding dBR for each sector can be calculated. Additionally, the total lightning activity for the grid can also be determined to result in a dBR for the entire grid.

The data analysis module 204 can use the dBR of the grid to generate (306) proxy radar reflectivity data. In some embodiments, the data analysis module 204 can use a rate of change of the dBR and the geographical area of the lightning activity to generate proxy radar reflectivity data. A transfer function is applied which correlates the dBR of the grid to a proxy reflectivity value. The coefficients for the transfer function are determined by calibrating the dBR with a ground based radar system's dBZ value. The proxy reflectivity data represents a measure of the precipitation intensity in a particular grid or sector of the grid. Similar to radar reflectivity data as generated by traditional radar systems (e.g., Doppler), the proxy reflectivity data generated by the data analysis module 206 can be used to produce radar-type images that visually present the proxy reflectivity data as polygons on a geographical map. As a result, the system 100 described herein produces advanced information to those that are potentially affected by an approaching storm without requiring an existing radar installation that monitors the affected geographical area.

Because the proxy reflectivity data is a measure of precipitation intensity, the data analysis module 204 can use the proxy reflectivity data to calculate cumulative precipitation over time for a particular geographic area. The data analysis module 204 can be further configured to calculate an estimated amount of precipitation at periodic intervals (e.g., daily, weekly, monthly, or annual). By providing estimations of precipitation, the data analysis module 204 allows affected areas to prepare adequately for the precipitation by improving safeguards, infrastructure, disaster planning and the like.

In some embodiments, the data analysis module 204 receives the lightning flash data from the data collection module 202 and positions each lightning flash according to its geographic location. The data analysis module 204 then analyzes the relative position of the lightning flashes to determine the potential boundaries or contours of specific lightning cells.

In some embodiments, the data analysis module 204 executes a series of processes to determine the location and contours of a lightning cell in the grid. The data analysis module 204 uses the lightning flash data collected during a specific time period (e.g., one minute) and places the lightning flashes on a map. The data analysis module 204 then superimposes a coarse grid on the map to quickly locate areas of interest for further analysis. The data analysis module 204 identifies the sectors of the grid that contain a high percentage or density of lightning flashes and superimposes a fine grid on the identified sectors. The data analysis module 204 employs density functions on the sectors of the fine grid to locate closed contours associated with a lightning cell. The data analysis module 204 generates a convex polygon from each of the closed contours. The data analysis module 204 repeats this gridding process at the expiration of a specific time period (e.g., one minute) in order to track changes in movement, direction and lightning flash rate of the lightning cell, as well as tracking the dBR for the grid and the individual areas of the grid.

The data analysis module 204 can calibrate the dBR using various techniques to enhance the proxy reflectivity data. In some embodiments, the data analysis module 204 correlates the dBR to traditional radar reflectivity data (dBZ) and/or other sources of data that are collected from the same or similar geographical areas or climates, to determine a relationship between dBR and dBZ. The relationship between dBR and dBZ can be expressed as $dBZ = a*dBR + b$, where a and b are the coefficients calibrated based on the climate regions and seasons. In some regions the relationship between dBZ and dBR may be more complex. The data analysis module 204 can leverage a known relationship between dBR and dBZ for a particular climate to generate proxy reflectivity data for a different geographical area that has the same climate without the need for dBZ data for that geographical area.

In some embodiments, the data analysis module 204 augments the lightning data analysis and the correlation between dBR and dBZ with additional information, such that the resulting proxy radar reflectivity data is more accurate. For example, the additional information can be related to the climate (e.g., mountainous, tropical, or subtropical) of the geographical area being monitored by the lightning detection network and the radar-based network. Because the climate of a particular area affects the expected lightning activity and rate, the data analysis module 204 takes the climate-related attributes into account when determining the existence and potential for severe weather using the lightning and radar data.

Because the correlation between dBR and dBZ can be determined for a particular region with a certain climate, the radar-type images can be generated by the graphics processing module 206 for a geographical area having a similar climate that does not have access to localized radar reflectivity data. For example, the data analysis module 204 can determine the dBR for a thunderstorm in northern Florida, a humid subtropical climate. The data analysis module 204 can correlate the dBR for the thunderstorm with dBZ data for the storm, as collected by a radar system monitoring northern Florida. Once the data analysis module 204 determines the relationship between dBR and dBZ for the storm, the module 204 can apply that relationship to other areas of the world that have a humid subtropical climate but may not have a traditional radar system installed (e.g., certain areas of interior Africa). Because installation of a lightning detection network in areas like interior Africa is much more cost-effective than a traditional radar system, the data analysis module 204 can generate proxy reflectivity data for these areas by collecting lightning activity data using the detection network, determining the dBR for the lightning data, and applying a known relationship between the determined dBR and the dBZ for a geographical area having the same climate.

The proxy reflectivity data can also be compared with forecast model data relating to the prediction of precipitation and other weather phenomena. The comparison of proxy reflectivity data with forecast model reflectivity data allows the data analysis module 204 to make each set of data more accurate. In some embodiments, the data analysis module 204 merges the proxy reflectivity data with forecast model reflectivity data at areas where precipitation intensity is similar. In some embodiments, the data analysis module 204 dampens the proxy reflectivity data—meaning less weight is afforded the proxy reflectivity data—at areas where the forecast model shows intense precipitation and the proxy reflectivity data does not show intense precipitation especially if the forecast model does not predict that this area of precipitation is from convective storm activity. In some embodiments, the data analysis module 204 determines that the proxy reflectivity data supersedes the forecast model data at areas where at areas where the proxy reflectivity data shows intense precipitation and the forecast model does not show intense precipitation. The methods used to merge proxy reflectivity data and forecast model reflectivity data are based on a weighted interpolation between the reflectivity values. It is understood that other methods and techniques could be used without departing from the scope of the invention.

Figure 4:
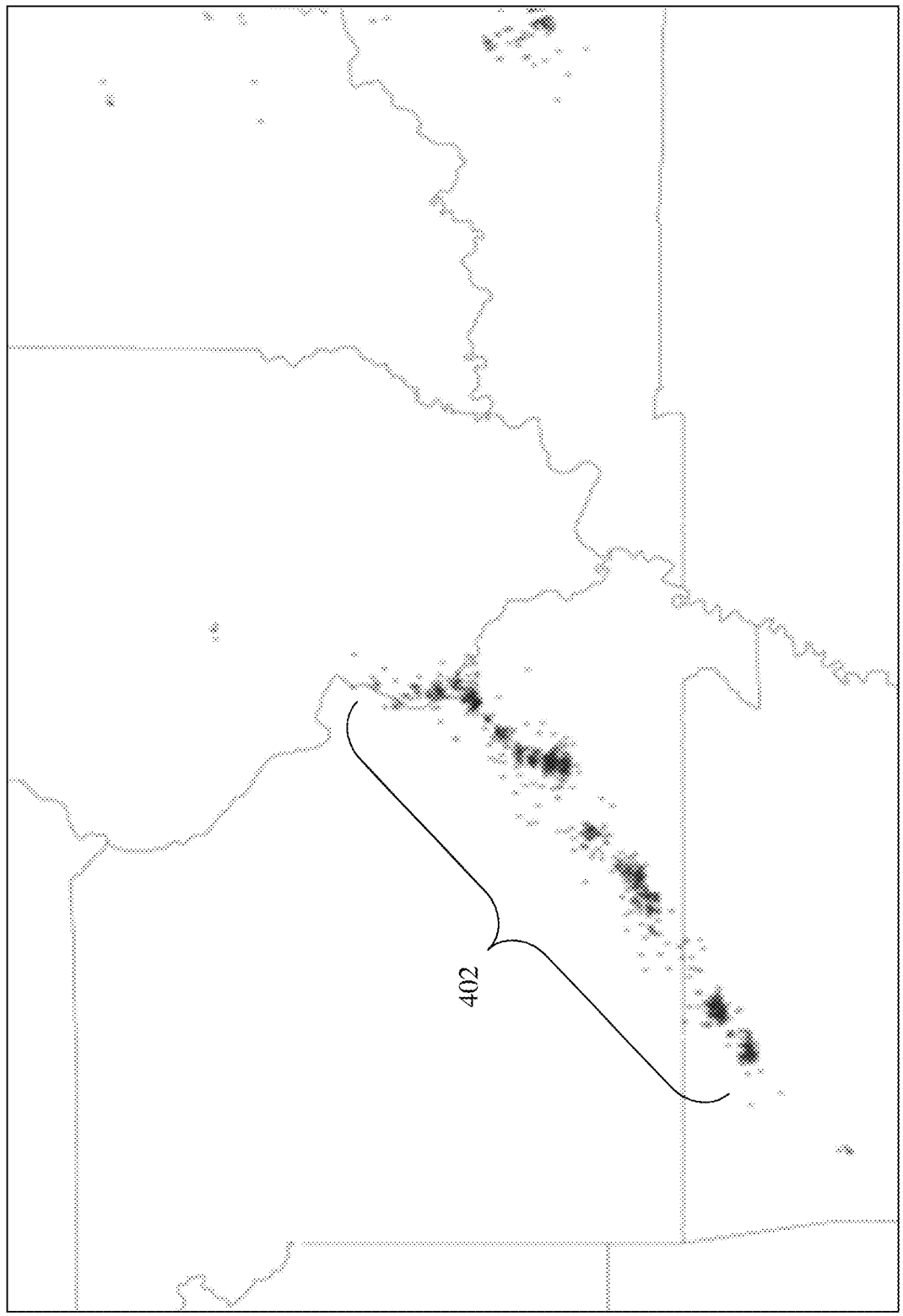
FIG. 4 is a geographical map image depicting the location of lightning strike data, as generated by the system of FIG. 2.
Figure 5:
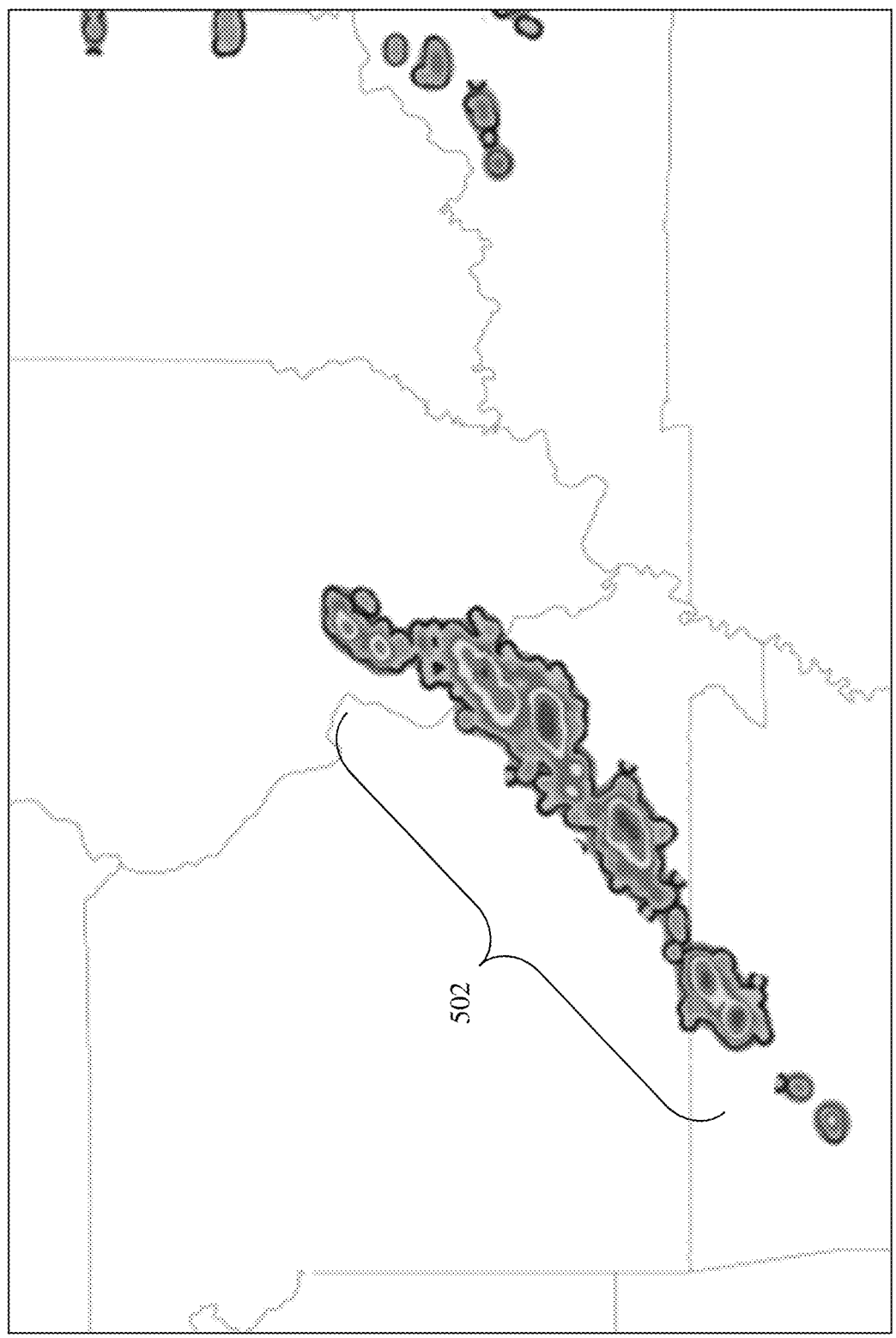
FIG. 5 is a geographical map image depicting proxy reflectivity data, as generated by the system of FIG. 2.
Figure 6:
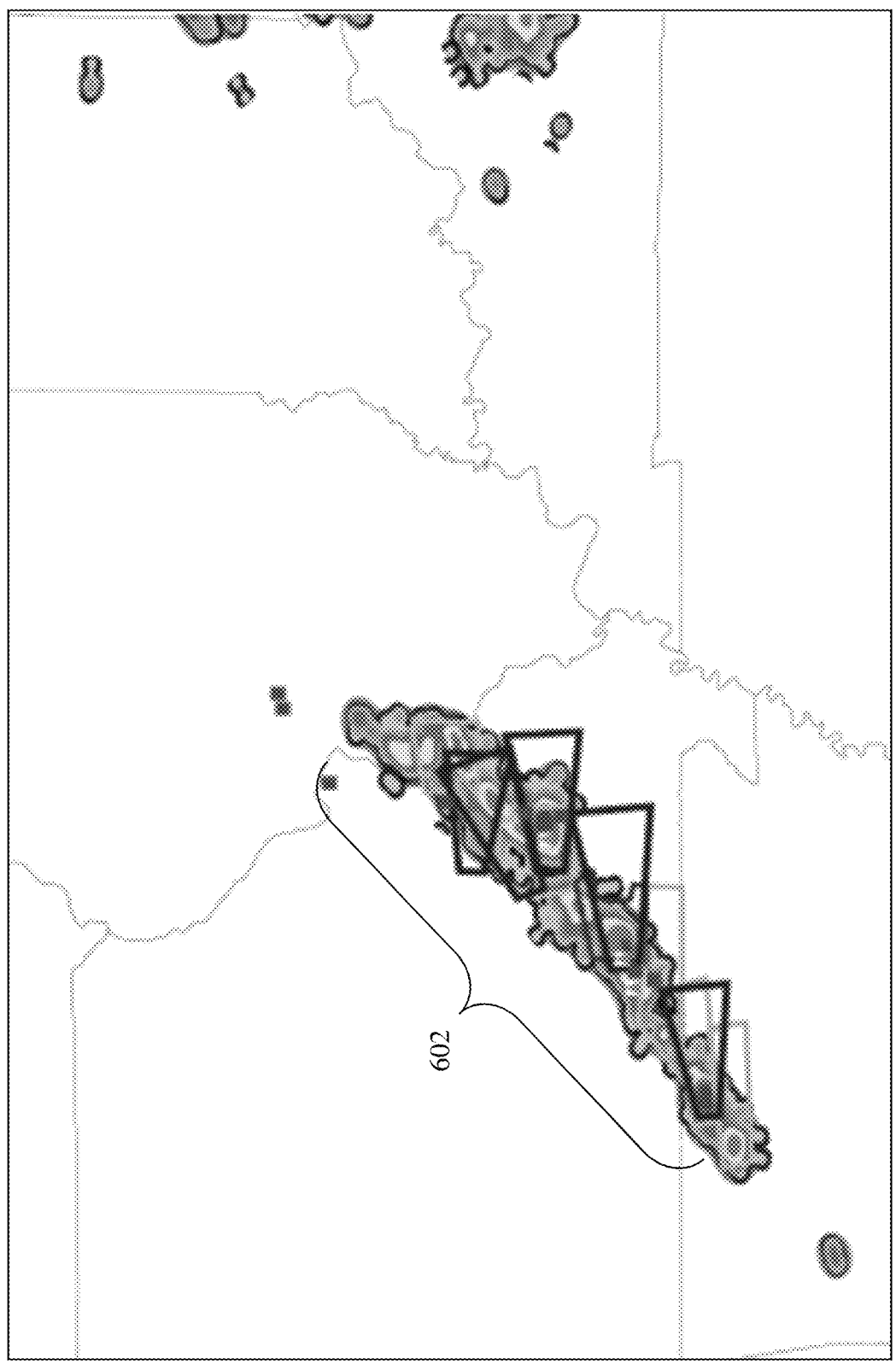
FIG. 6 is a geographical map image depicting proxy reflectivity data augmented with visual indicators of dangerous thunderstorm activity, as generated by the system of FIG. 2.

After the data analysis module 204 has analyzed the lightning data, correlated the lightning data with radar data, and determined the location of lightning cells that are associated with severe weather activity, the data analysis module 204 instructs the graphics processing module 206 to generate images using the analyzed lightning data. FIGS. 4-6 are geographical map images as generated by the system of FIG. 2. FIG. 4 is a geographical map depicting the location of lightning strike data. FIG. 5 is a geographical map depicting proxy reflectivity data. FIG. 6 is a geographical map depicting proxy reflectivity data augmented with visual indicators of dangerous thunderstorm activity.

As shown in FIG. 4, the system 100 determines the location of both cloud-to-ground and intracloud lightning pulses or strikes based on the received lightning activity data and plots the location on a geographical map image that corresponds to the areas covered by the sensors 102a-102c. The dots 402 in FIG. 4 represent the plotted location of each lightning strike.

Once the lightning strikes are plotted, the data analysis module 204 determines the dBR for the lightning activity data and generates the proxy reflectivity data based on the dBR. The graphics processing module 206 then generates radar-type images based on the proxy reflectivity data by using the same palette that Doppler radar visualization uses. As shown in FIG. 5, the radar-type images 502 generated by the graphics processing module 206 appears visually like a radar image produced by a traditional radar-based system, with different colors and contours to represent the severity of a particular weather system. For example, the location experiencing the most dangerous weather (e.g., precipitation or lightning strikes) can be denoted with a particular color (e.g., red) while areas with lesser degrees of severity can be denoted with different colors in a gradient (e.g., orange, yellow and green). In some embodiments, the graphics processing module 206 is a separate graphics processing unit (GPU) (e.g., a graphics card) or a software module configured to produce graphic drawings and designs based on the lighting activity data.

In some embodiments, the graphics processing module 206 generates a proxy (or simulated) radar map image of severe weather, such as convective storms. Because of the strong correlation between in-cloud and cloud-to-ground flash rate (dBR) and radar reflectivity (dBZ), the graphics processing module 206 creates radar-type images for a particular geographical area or region that corresponds closely to radar images for the same area or region that are generated by a traditional radar-based system (see FIG. 5).

In some embodiments, the graphics processing module 206 generates visual indicators in conjunction with the proxy radar images, where the visual indicators relate to potential flooding and storm motion. The graphics processing module 206 retrieves lightning/radar correlation data from the data storage 208 and generates a radar-type image with visual indicator(s) representing areas of potential flooding and storm motion. In some embodiments, the correlation data used to generate the indicator is a correlation between the total lightning flash rate ranging from 0-200 flashes per minute and the radar reflectivity ranging from 0-75 decibels.

In some embodiments, the graphics processing module 206 generates visual indicators in conjunction with the proxy radar image, where the visual indicators highlight the potential for dangerous total lightning flash cells that increase the likelihood of damaging winds, large hail, and/or tornadoes within convective storms. As shown in FIG. 6, the radar-type images are augmented with polygons that represent the potential movement path and severity of dangerous thunderstorm cells. As described previously, the graphics processing module 206 retrieves lightning cell tracking data from the data storage 208 and/or data analysis module 204 to generate an image having storm cells, where the total lightning flash rate within a particular cell is correlated with the radar reflectivity data.

In some embodiments, the server computing device 102 includes an alert generation module (not shown). The alert generation module uses the analyzed characteristics of the lightning data to automatically determine geographical areas that may be impacted by severe weather associated with the lightning data as, e.g., a lightning cell moves and changes in size and/or intensity.

To issue an alert that reaches persons and/or entities that may be directly affected by the severe weather or that may have an interest in the affected area, the alert generation module determines one or more geographical areas at risk based on the location, movement speed and movement direction of a lightning cell. In some embodiments, the alert generation module determines a warning area that corresponds to the current location and expected track of the cell during an upcoming period of time. For example, the alert generation module generates a polygon (as shown by reference character 602 in FIG. 6) that covers the range of distances and directions that a lightning cell could travel in a specific period of time (e.g., forty-five minutes) by evaluating the movement speed and the movement direction of the cell demonstrated at the time the data analysis module determines that the total lightning rate of the cell exceeded the threshold lightning rate.

After receiving notification from the data analysis module 204 and determining one or more areas at risk, the alert generation module automatically identifies a set of one or more remote devices that are monitoring the at-risk areas and automatically transmits an alert to the remote devices. The remote devices can include computer-based devices, such as mobile phones and global positioning system (GPS) hardware. The remote devices can also include other types of warning systems, such as lights, sirens and horns that are configured to connect to a communications network. In some embodiments, the data storage device 208 includes information related to identification of the remote devices (e.g., IP address, phone number, email address), and the alert generation module uses the identification information to prepare an alert for each remote device. The data storage device 208 also includes information mapping the identification of a remote device to a particular geographic area or areas that the remote device is monitoring (e.g., zip code, county name, street address). The alert generation module uses any standard communication protocol or technique, such as packet-based delivery (e.g., text messaging, XML, email), circuit-based delivery (e.g., paging, voice messaging), and the like. For example, a user can subscribe to receive alerts for a particular zip code on his mobile phone. The system 100 stores the user's telephone number in the data storage module 208. When the alert generation module identifies a geographic location that is at risk for severe weather and all or part of the identified location falls within the zip code submitted by the user, the alert generation module issues an alert (e.g., a text message, a voice message) addressed to the telephone number of the user's mobile phone. In this embodiment, the user's mobile phone need not be located in the same geographic area as identified by the alert generation module as "at risk."

After the server computing device 106 has generated the radar-type images using the lightning data, the server 106 can transmit the images and related information to any number of remote devices equipped or capable of receiving them. For example, the server 106 can transmit the proxy radar map to a mobile device using standard communication techniques (e.g., cellular, wireless). As described above, the server 106 can generate and issue severe weather alerts to remote devices that incorporate the proxy radar map—which allows for increased awareness of incoming severe weather.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A computerized method for generating proxy reflectivity data and radar-type images associated with lightning activity, the method comprising:
   detecting, by a network of lightning detection sensors each monitoring a particular geographical area, radio-frequency (RF) energy data associated with lightning flashes in the corresponding geographical area;
   transmitting, by the network of lightning detection sensors, the RF energy data to a computing device communicably coupled to the network of lightning detection sensors;
   formatting, by the computing device, the RF energy data received from the network of lightning detection sensors into consolidated lightning flash data;
   identifying, by the computing device, one or more cells of lighting activity based upon the consolidated lightning flash data, comprising positioning each lightning flash on a map according to its geographic location, superimposing a coarse grid on the map and identifying sectors of the coarse grid with a high density of lightning flashes, superimposing a fine grid only on the identified sectors of the map to locate closed contours associated with a lightning cell within the identified sectors, and generating a convex polygon from each of the closed contours, wherein sectors of the coarse grid are larger in geographic area than sectors of the fine grid;
   determining, by the computing device, a logarithmic scale of a combined in-cloud and cloud-to-ground flash rate (dBR) for the identified cells of lightning activity;
   generating, by the computing device, proxy reflectivity data based on the dBR of the identified cells of lightning activity, a rate of change of the dBR, and the geographical location of the identified cells of lightning activity;
   generating, by a graphics processing unit (GPU) of the computing device, radar-type images based upon the proxy reflectivity data, the radar-type images including a polygon that has a position corresponding to a position of each convex polygon generated by the computing device and that has a color associated with a severity of the lightning activity;
   displaying, by a display device coupled to the GPU, the radar-type images; and
   issuing, by the computing device, the radar-type images to one or more remote computing devices monitoring geographical areas at risk that correspond to geographical areas in the radar-type images as part of an alert notification message, and
   upon receiving the alert notification message, each remote computing device activating a display screen of the remote computing device and updating the display screen to show the radar-type images.

2. The method of claim 1, wherein the proxy reflectivity data is based on a calibration of the dBR with reflectivity data generated by a radar (dBZ).

3. The method of claim 2, wherein the geographical areas associated with the received data correspond to one or more geographical areas being monitored by a radar network.

4. The method of claim 2, wherein a climate of the geographical areas associated with the received data matches a climate of one or more geographical areas being monitored by the radar network.

5. The method of claim 1, wherein the radar-type images are comprised of grids that represent precipitation intensity.

6. The method of claim 5, wherein the radar-type images use different colors and contours to represent levels of precipitation intensity associated with the grids.

7. The method of claim 1, further comprising combining, by the computing device, the proxy reflectivity data with a forecast model; and generating, by the computing device, a proxy radar map of precipitation intensity based upon the combined reflectivity data and forecast model for display on a display device coupled to the computing device.

8. The method of claim 7, wherein the proxy radar map includes one or more visual indicators related to areas of potential or actual flooding.

9. The method of claim 7, wherein the proxy radar map includes one or more visual indicators related to storm motion.

10. The method of claim 7, wherein the proxy radar map includes one or more visual indicators related to dangerous cells of lightning activity.

11. The method of claim 7, wherein the proxy reflectivity data is merged with the forecast model at areas where precipitation intensity is similar.

12. The method of claim 7, wherein the proxy reflectivity data is dampened at areas where the forecast model shows intense precipitation and the proxy reflectivity data does not show intense precipitation.

13. The method of claim 7, wherein the proxy reflectivity data supersedes the forecast model at areas where the proxy reflectivity data shows intense precipitation and the forecast model does not show intense precipitation.

14. The method of claim 1, further comprising transmitting, by the computing device, the proxy reflectivity data to a remote computing device.

15. A computerized system for generating proxy reflectivity data and radar-type images associated with lightning activity, the system comprising a computing device having a processor and a graphics processing unit (GPU) that is communicably coupled to a network of lightning detection sensors each monitoring a particular geographical area, the network of lightning detection sensors configured to:
   detect radio-frequency (RF) energy data associated with lightning flashes in the corresponding geographical area, and
   transmit the detected RF energy data to the computing device;
   the processor of the computing device configured to:
      format the RF energy data received from the network of lightning detection sensors into consolidated lightning flash data;
      identify one or more cells of lighting activity based upon the consolidated lightning flash data, comprising positioning each lightning flash on a map according to its geographic location, superimposing a coarse grid on the map and identifying sectors of the coarse grid with a high density of lightning flashes, superimposing a fine grid only on the identified sectors of the map to locate closed contours associated with a lightning cell within the identified sectors, and generating a convex polygon from each of the closed contours, wherein sectors of the coarse grid are larger in geographic area than sectors of the fine grid;

determine a logarithmic scale of a combined in-cloud and cloud-to-ground flash rate (dBR) for the identified cells of lightning activity; and generate proxy reflectivity data based on the dBR of the identified cells of lightning activity, a rate of change of the dBR, and the geographical location of the identified cells of lightning activity;

the GPU configured to generate radar-type images based upon the proxy reflectivity data for display on a display device coupled to the GPU, the radar-type images including a polygon that has a position corresponding to a position of each convex polygon generated by the computing device and that has a color associated with a severity of the lightning activity; and the computing device configured to issue the radar-type images to one or more remote computing devices monitoring geographical areas at risk that correspond to geographical areas in the radar-type images as part of an alert notification message, and upon receiving the alert notification message, each remote computing device activating a display screen of the remote computing device and updating the display screen to show the radar-type images.

16. The system of claim 15, wherein the proxy reflectivity data is based on a calibration of the dBR with reflectivity data generated by a radar (dBZ).

17. The system of claim 16, wherein the geographical areas associated with the received data correspond to one or more geographical areas being monitored by a radar network.

18. The system of claim 16, wherein a climate of the geographical areas associated with the received data matches a climate of one or more geographical areas being monitored by the radar network.

19. The system of claim 15, wherein the radar-type images are comprised of grids that represent precipitation intensity.

20. The system of claim 19, wherein the radar-type images use different colors and contours to represent levels of precipitation intensity associated with the grids.

21. The system of claim 15, wherein the processor is further configured to combine the proxy reflectivity data with a forecast model, and the GPU is further configured to generate a proxy radar map of precipitation intensity based upon the combined reflectivity data and forecast model for display on a display device coupled to the GPU.

22. The system of claim 21, wherein the proxy radar map includes one or more visual indicators related to areas of potential or actual flooding.

23. The system of claim 21, wherein the proxy radar map includes one or more visual indicators related to storm motion.

24. The system of claim 21, wherein the proxy radar map includes one or more visual indicators related to dangerous cells of lightning activity.

25. The system of claim 21, wherein the proxy reflectivity data is merged with the forecast model at areas where precipitation intensity is similar.

26. The system of claim 21, wherein the proxy reflectivity data is dampened at areas where the forecast model shows intense precipitation and the proxy reflectivity data does not show intense precipitation.

27. The system of claim 21, wherein the proxy reflectivity data supersedes the forecast model at areas where the proxy reflectivity data shows intense precipitation and the forecast model does not show intense precipitation.

28. The system of claim 15, wherein the processor is further configured to transmit the proxy reflectivity data to a remote computing device.

29. The system of claim 15, wherein the processor is further configured to calculate cumulative precipitation over time based on the proxy reflectivity data.

30. The system of claim 29, wherein the processor is further configured to calculate a daily estimated precipitation.

31. The system of claim 29, wherein the processor is further configured to calculate a monthly estimated precipitation.

32. The system of claim 29, wherein the processor is further configured to calculate an annual estimated precipitation.

33. A computer program product, tangibly embodied in a non-transitory computer readable storage medium, for generating proxy reflectivity data and radar-type images associated with lightning activity, the computer program product including instructions operable to cause a computing device having a processor and a graphics processing unit (GPU) and that is communicably coupled to a network of lightning detection sensors to:

detect, by the network of lightning detection sensors, radio-frequency (RF) energy data associated with lightning flashes in the corresponding geographical area, transmit, by the network of lightning detection sensors, the detected RF energy data to the computing device;

format, by the processor, the RF energy data received from the network of sensors into consolidated lightning flash data;

identify, by the processor, one or more cells of lighting activity based upon the lightning flash data, comprising positioning each lightning flash on a map according to its geographic location, superimposing a coarse grid on the map and identifying sectors of the coarse grid with a high density of lightning flashes, superimposing a fine grid only on the identified sectors of the map to locate closed contours associated with a lightning cell within the identified sectors, and generating a convex polygon from each of the closed contours, wherein sectors of the coarse grid are larger in geographic area than sectors of the fine grid;

determine, by the processor, a logarithmic scale of a combined in-cloud and cloud-to-ground flash rate (dBR) for the identified cells of lightning activity, a rate of change of the dBR, and the geographical location of the identified cells of lightning activity;

generate, by the processor, proxy reflectivity data based on the dBR of the identified cells of lightning activity;

generate, by the GPU, radar-type images based upon the proxy reflectivity data for display on a display device coupled to the GPU, the radar-type images including a polygon that has a position corresponding to a position of each convex polygon generated by the computing device and that has a color associated with a severity of the lightning activity; and issue, by the computing device, the radar-type images to one or more remote computing devices monitoring geographical areas at risk that correspond to geographical areas in the radar-type images as part of an alert notification message, and upon receiving the alert notification message, each remote computing device activating a display screen of the remote computing device and updating the display screen to show the radar-type images.

\* \* \* \* \*